US006987183B2

(12) United States Patent
Heikkila et al.

(10) Patent No.: US 6,987,183 B2
(45) Date of Patent: *Jan. 17, 2006

(54) METHOD FOR RECOVERING PRODUCTS

(75) Inventors: Heikki Heikkila, Espoo (FI); Juho Jumppanen, Espoo (FI); Vesa Kurula, Kantvik (FI); Vili Ravanko, Kirkkonummi (FI); Tiina Tervala, Kirkkonummi (FI); Nina Mayra, Helsinki (FI)

(73) Assignee: Danisco Sweeteners Oy, Kotka (FI)

( * ) Notice: Subject to any disclaimer, the term of this patent is extended or adjusted under 35 U.S.C. 154(b) by 70 days.

This patent is subject to a terminal disclaimer.

(21) Appl. No.: 09/967,184

(22) Filed: Sep. 28, 2001

(65) Prior Publication Data

US 2002/0120135 A1 Aug. 29, 2002

(30) Foreign Application Priority Data

Sep. 29, 2000 (FI) ................................. 20002148

(51) Int. Cl.
  *C07G 17/00* (2006.01)
  *C07H 1/00* (2006.01)
  *C07H 3/00* (2006.01)
  *C08B 37/00* (2006.01)
(52) U.S. Cl. ...................... 536/124; 536/127; 536/128; 127/43; 127/44; 127/46.1; 127/46.2; 127/46.3; 127/55; 127/58; 210/660; 210/661; 210/663
(58) Field of Classification Search ............. 536/124, 536/127, 128, 1.1; 127/43, 44, 46.1, 46.2, 127/46.3, 53, 55, 58; 210/660, 661, 663
See application file for complete search history.

(56) References Cited

U.S. PATENT DOCUMENTS

| | | | |
|---|---|---|---|
| 2,684,331 A | 7/1954 | Bauman | |
| 2,911,362 A | 11/1959 | Wheaton | |
| 4,075,406 A | 2/1978 | Melaja et al. | |
| 4,358,322 A | 11/1982 | Neuzil et al. | |
| 4,631,129 A | 12/1986 | Heikkila | |
| 4,664,718 A | 5/1987 | Chang | |
| 4,772,334 A | 9/1988 | Hatanaka et al. | |
| 4,816,078 A | 3/1989 | Schiweck et al. | |
| 4,880,919 A | 11/1989 | Kulprathipanja | |
| 4,904,769 A * | 2/1990 | Rauenbusch ............... 536/17.2 |
| 5,084,104 A | 1/1992 | Heikkila et al. | |
| 5,407,580 A | 4/1995 | Hester et al. | |
| 5,407,817 A | 4/1995 | Lightsey et al. | |
| 5,506,123 A | 4/1996 | Chieffalo et al. | |
| 5,538,637 A | 7/1996 | Hester et al. | |
| 5,571,703 A | 11/1996 | Chieffalo et al. | |
| 5,726,046 A | 3/1998 | Farone et al. | |
| 5,779,164 A | 7/1998 | Chieffalo et al. | |
| 5,820,687 A | 10/1998 | Farone et al. | |
| 5,968,362 A | 10/1999 | Russo, Jr. | |
| 5,975,439 A | 11/1999 | Chieffalo et al. | |
| 5,998,607 A * | 12/1999 | Heikkila et al. | |
| 6,267,309 B1 | 7/2001 | Chieffalo et al. | |
| 6,391,204 B1 | 5/2002 | Russo, Jr. | |
| 6,419,828 B1 | 7/2002 | Russo, Jr. | |

FOREIGN PATENT DOCUMENTS

| | | |
|---|---|---|
| WO | WO 96/27028 | 9/1996 |
| WO | WO 97/49658 | 12/1997 |
| WO | WO 99/57326 | 11/1999 |

OTHER PUBLICATIONS

Blaschek et al., "Complete Separation and Quantification of Neutral Sugars from Plant Cell Walls and Mucilages by High-Performance Liquid Chromatography", Journal of Chromatography, 256 (1983), pp. 157-163.*
Derwent's abstract, Accession No. 2000-376948, week 0033, Abstract of CN, 1234404 (Univ Huadong Sci & Eng) Nov. 10, 1999.
STN International, Accession No. 1982:541125, document No. 97.141125, Trusova, L.I. et al.: "Chromatographic determination of carbohydrates and ketonic acids in culture media"; TR.-Vses. Gos. Nauchno-Kontrol'n. Inst. Vet. Prep., 29-30, 114-21 (Russian) 1980.
Blaschek, Wolfgang, Journal of Chromatography, 256 (1983) 157-163 "Complete separation and quantification of neutral sugars from plant cell walls and mucilages by high-performance liquid chromatography".
JP-A-9127090, Chemical Abstract 127:47442, dated Nov. 2, 1995.
Finnish Patent Application No. 962,609 (corresponding to U.S. Appl. No. 08/880,382), (1997).
Samuelson, Olof, J. Methods Carbohy. Chem., 6 (1972) 65-75 "Partition Chromatography on Ion-Exchange Resins".
Takasaki, Yoshiyuki, Agr. Biol. Chem. 36 (1972) pp. 2575-2577 "On the Separation of Sugars".
Lindberg, Bengt et al., Carbohyd. Res. 5 (1967) pp. 286-291 "Preparative Separations Of Sugars On Bisulphite Resins".
DE 3545107 [corresponding to U.S. Appl. No. 4,772,334 (to Masayoshi et al.)], (1988).
Barker, S.A. et al., Carbohydrate Research, 26 (1973) 55-64 "The Use of Poly(4-vinylbenzeneboronic Acid) Resins in the Fractionation and Interconversion of Carbohydrates".

(Continued)

*Primary Examiner*—James O. Wilson
*Assistant Examiner*—Traviss C. McIntosh, III
(74) *Attorney, Agent, or Firm*—Sterne, Kessler, Goldstein & Fox P.L.L.C.

(57) ABSTRACT

The present invention is directed to a method comprising a multistep process for recovering one or more monosaccharides from a solution containing at least two monosaccharides selected from the group consisting of rhamnose, arabinose, xylose and mixtures thereof by using chromatographic separation comprising at least one step, where a weak acid cation exchange resin is used for the chromatographic separation.

48 Claims, 9 Drawing Sheets

OTHER PUBLICATIONS

CA 1249812 [corresponding to U.S. Appl. No. 4,631,129 (to Heikkila)], (1986).

Finnish Patent Application No. 97625 [corresponding to WO 96/27028], (1996).

* cited by examiner

METHOD FOR RECOVERING PRODUCTS

FIELD OF THE INVENTION

The present invention relates to a method comprising a multistep process for recovering rhamnose and optionally arabinose. More particularly the present invention relates to the use of a weakly acid cation exchange resin in a chromatographic column in a multistep process.

BACKGROUND OF THE INVENTION

U.S. Pat. No. 2,684,331 (to Bauman) discloses a method for separating chromatographically from one another two or more substances having widely different ionization constants in which at least one of the substances undergoes considerable ionization in a dilute aqueous solution thereof. However, the method has not been used for separating sugars. The examples of U.S. Pat. No. 2,684,331 describe separation of salts from organic solvents, e.g. sodium chloride from formaldehyde. The method comprises an ion exchange resin having an ion identical with an ion of highly ionized solute. The ion exchange resin is either a cation exchange resin having an acidic form or an anion exchange resin having a basic form. The cation exchange resin contains sulphonic acid groups. The anion exchange resin contains quaternary ammonium groups.

U.S. Pat. No. 2,911,362 (to Wheaton) describes a method comprising a chromatographic separation process employing ion exchange resins for separating two or more water soluble organic compounds from one another in an aqueous medium in the absence of an ion exchange reaction, i.e. in the substantial absence of a chemical reaction involving an absorption of ions from the aqueous medium by the resin or the introduction of ions into the solution from the resin. According to said method the ion exchange resin can be either a cation exchange resin or an anion exchange resin. The cation exchange resin may contain either sulfonic acid groups or carboxylic acid groups. The anion exchange resin contains quaternay ammonium groups. However, the method has not been used for separating sugars.

Chromatographic separation has been used for recovering xylose from hydrolysates of natural materials such as birch wood, corn cobs and cotton seed hulls in a method described in U.S. Pat. No. 4,075,406 (to Melaja, et al.). The resin employed in the chromatographic separation is a strongly acid cation ex-changer, i.e. sulfonated polystyrene cross-linked with divinyl benzene. The use of a strongly acid cation exchanger for separating monosaccharides, e.g. xylose, from magnesium sulfite cooking liquor is also known from Finnish Patent Application No. 962 609. The chromatographic separation is carried out by using a simulated moving bed. However, the separation of certain monosaccharides by using strongly acid cation exchange resins has turned out to be difficult. For instance the separation of rhamnose from other carbohydrates with strongly acid cation exchange resins and strongly basic cation exchange resins has been possible by using solvents such as alcoholic solvents as eluants (see e.g. Samuelson O., Chromatography on ion exchange resins, J. Methods Carbohy. Chem. 6 (1972) 65–75). In the described system anhydro sugars, such as rhamnose, have a shorter retention time than most of the aldoses and ketoses. Water would be a preferred eluant, but the use of water has not, however, been described in this connection. The problem when using water is that the various monosaccharides, such as rhamnose, xylose and arabinose, have almost similar retention times, whereby the fractions will overlap.

The separation of carbohydrates, especially xylose by strongly acid cation exchangers has been practiced industrially but is complicated. The method presented in U.S. Pat. No. 5,998,607 (to Heikkila, et al.) has been used especially for separating xylose from magnesium spent liquor. The problem has been the unsufficient separation of xylose and xylonic acid and there is no suggestion of the use of a weakly acid cation exchange resin possibly giving a benefit for solving the problem. In the disclosed method the separation requires two steps. In the first step the cation exchange resin is used preferably in alkaline earth form, more preferably in $Mg^{2+}$ form and in the second step the cation exchange resin is preferably in alkali-metal form (e.g. sodium). However, the separation of monosaccharides has also been found to be unsatisfactory since all the other sugars elute at almost similar retention time with xylose. The pH used in the process low. The resin in a divalent form seemed to separate the xylose more effectively than the resin in a monovalent form.

Anion exchange resins have been used for separating fructose from glucose. Y. Takasaki (Agr. Biol. Chem. 36 (1972) pages 2575–77) and B. Lindberg et al. (Carbohyd. Res. 5 (1967), pages 286–291) describe the use of an anion exchanger in bisulfite form for the separation of sugars. However, the use of anion exchange resins does not result in good xylose separation because xylose is overlapped by other sugars.

U.S. Pat. No. 4,358,322 (to Neuzil, et al.) discloses a process for separating fructose from a feed mixture comprising fructose and glucose. The process comprises contacting the mixture with an adsorbent comprising aluminosilicate or zeolite. The adsorbent contains one or more selected cations at exchangable cation sites. The cations are selected from the group consisting of sodium, barium and strontium. The cationic pairs used in the cationic sites are selected from the group consisting of barium and potassium and barium and strontium.

U.S. Pat. No. 5,084,104 (to Heikkila, et al.) discloses a method for the separation of xylose from a pentose-rich solution, e.g. birch wood. A chromatographic column which comprises a strongly basic anion exchange resin is used. The anion exchange resin is in sulfate form. Using this method xylose is retarded most strongly and the other monosaccharides are eluted faster.

A method for preparing of L-arabinose is known from the publication WO 99/57326 where the process is characterized by contacting plant fibers with an acid to hydrolyze the fibers under such conditions that the L-arabinose ingredients contained in the plant fibers are selectively obtained. U.S. Pat. No. 4,880,919 (to Kulprathipanja) discloses a process for separating arabinose from mixtures of monosaccharides containing arabinose and other aldopentoses and aldohexoses by adsorption on sulfonated polystyrene divinyl benzene crosslinked ion exchange resins exchanged with $Ca^{2+}$ and $NH_4^+$ ions and desorpting the adsorbate with water. A process for producing crystalline L-arabinose is known from U.S. Pat. No. 4,816,078 (to Schiweck, et al.).

The preparation of arabinose is also known from U.S. Pat. No. 4,664,718 (to Chang). In the described method, arabinose is separated from a mono-saccharide mixture containing also other aldopentoses and aldohexoses. The feed is contacted with with a calcium-Y-type or calcium-X-type zeolite and arabinose is adsorbed selectively. The desorption is conducted with water or ethanol.

Publication DE 3 545 107 describes a method for the preparation of rhamnose from arabic gum. A strongly acid cation exchange resin is used for the separation of sugars and rhamnose by adsorption with activated charcoal. Arabinose is also separated by this method.

Barker, S. A. et al (Carbohydrate Research, 26 (1973) 55–64) have described the use of poly(4-vinylbenzeneboronic acid) resins in the fractionation and interconversion of carbohydrates. In the method water is used as an eluant. The best yield of fructose was received when the pH was high. The resins have also been used to displace the pseudo equilibrium established in aqueous alkali between D-glucose, D-fructiose and D-mannose to yield D-fructose.

CA Patent No. 1 249 812 discloses a multistep process for the separation of sugars and lignosulphonates fron sulphite spent liquor. The process comprises the steps of (a) introducing sulphite spent liquor having a certain pH into a chromatographic column containing a resin in metal salt form, (b) eluting the column with water to obtain a substantially sugar-free lignosulphonate-rich fraction and a sugar-rich fraction, (c) collecting the sugar-rich fraction for further purification, (d) adjusting the pH of the fraction to a certain level and introducing it to a second column containing a resin in monovalent metal salt form, and (e) eluting the sugar-rich material from the second column to obtain a sugar-rich fraction and a lignosulphonate-rich fraction. The process of said CA patent does not include the use of a weakly acid cation exchange resin for chromatographic separation.

A process for crystallizing xylose is known from Finnish Patent 97 625. In the process xylose is recovered by crystallization from the solutions in which the xylose purity is relatively low. Especially the process concerns recovering xylose from biomass derived solutions.

When xylose is prepared by hydrolysing biomass derived xylose rich hemicellulose the mixture contains among xylose also glucose, galactose, rhamnose, mannose and arabinose. It also may contain acetic acid and uronic acids such as galacturonic acid and glucuronic acid. The hydrolysing acid and the uronic acid are generally easily removed by ion exclusion. However, it has been difficult to fractionate monosaccharide mixtures to their components.

Surprisingly it has been found that rhamnose and, if desired, arabinose can be effectively separated from carbohydrate streams by using weakly acid cation exchange resins. The order of elution seems to be, besides other factors, affected strongly by the hydrophobic/hydrophilic interaction between the carbohydrate and the resin. If the resin is in hydrophilic form, the most hydrophobic carbohydrate seems to elute first and the most hydrophilic last. For instance, the resin in $H^+$ form seems to be less hydrophilic than the resin in $Na^+$ form. The different elution order of components in a chromatographic column using a weakly acid cation exchange resin can be effectively used in the method of the present invention comprising a multistep process.

SUMMARY OF THE INVENTION

The above mentioned objects and others are accomplished by the present invention, which relates to a method for recovering a monosaccharide selected from the group consisting of rhamnose, arabinose, xylose and mixtures thereof from a solution containing at least two of said monosaccharides by a multistep process using chromatographic separation comprising at least one step, where a weakly acid cation exchange resin is used for the chromatographic separation.

The method may preferably contain additional steps comprising the use of chromatographic columns containing strongly acid cation exchange resins, evaporation, crystallization, etc.

BRIEF DESCRIPTION OF THE DRAWINGS

The following drawings are illusrative embodiments of the invention and are not meant to limit the scope of the invention as defined in the claims.

DETAILED DESCRIPTION OF THE INVENTION

Figure 1:
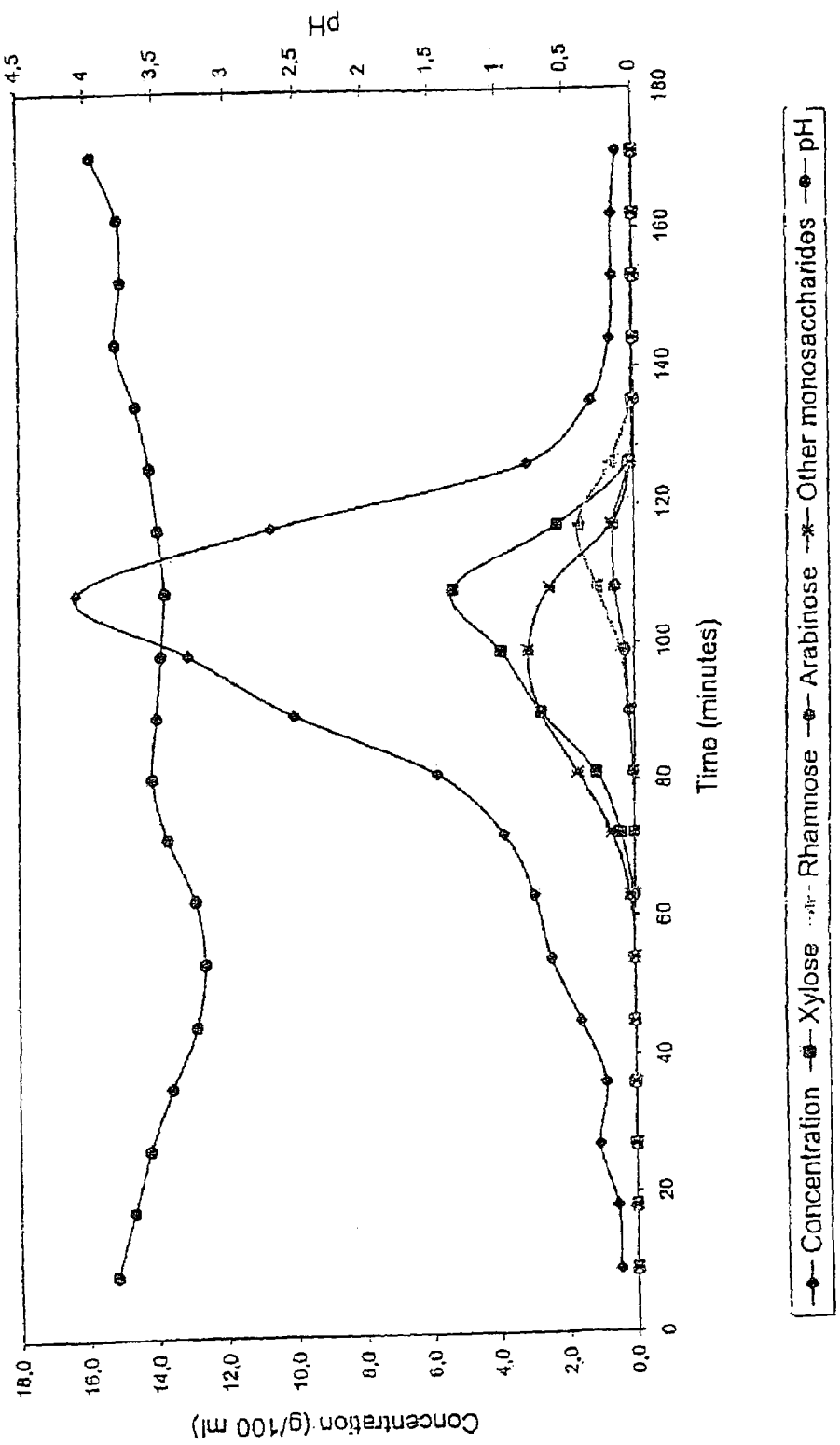
FIG. 1 is a graphical presentation of the elution profiles and pH according to Example 1.

According to the present invention a solution containing a monosaccharide selected from the group consisting of rhamnose, arabinose, xylose and mixtures thereof is subjected to a multistep process using chromatographic separation comprising at least one step, where a weakly acid cation exchange resin is used in a chromatographic column or part of it. The multi-step process according to the invention may preferably comprise additional steps, such as steps using chromatographic columns containing strongly acid cation exchange resins, evaporation, crystallization, etc. in order to enhance the effective separation of the desired product. Suitable starting solutions are those obtained by hydrolyzing hemicellulose. In addition to rhamnose the starting solution preferably contains arabinose and possibly xylose. Such solutions are for instance xylose process streams and side streams. In addition to rhamnose also other carbohydrates may be recovered by the method of the present invention. Such carbohydates are e.g. monosaccharides, such as arabinose, preferably L-arabinose, xylose, preferably D-xylose and mixtures thereof. The general opinion has been that an effective separation of the monosaccharides in question requires the use, for instance, of ion exclusion and size exclusion. The additional feature relating to the use of a weakly acid cation exchange resin is that if the resin is in hydrophilic form the most hydrophobic monosaccharide seems to be eluted first and the most hydrophilic monosaccharide is eluted last. The solution coasting rhamnose treated may be a product obtained from the processing of hydrolysates or prehydrolysates of hemicellulose from hard wood and xylose containing biomass, e.g. solutions formed in paper and dissolving pulp processing, for example si-cooking or prehydrolysis of sa-cooking.

The chromatographic column used in the method of the present invention is filled with a weakly acid cation exchange resin, preferably an acrylic cation exchange resin having carboxylic functional groups. However, the resin can be other than an acrylic resin and the functional group can be other than a carboxylic group, e.g. another weak acid. Such an acrylic resin is preferably derived from methyl acrylate, ethyl acrylate, buthyl acrylate, methylmethacrylate or acrylonitrile or acrylic acids or mixtures thereof. The resin may be crosslinked with a cross-linking agent, e.g. divinyl benzene (DVB). A suitable crosslinking degree is 1 to 20% by weight, preferably 3 to 8% by weight. The average particle size of the resin is normally 10 to 2000 $\mu$m, preferably 100 to 400 $\mu$m. The resin may be regenerated into $H^+$, $Na^+$, $Mg^{2+}$ or $Ca^{2+}$ form. However, also other ionic forms may be used.

The column is preferably eluted at temperatures from 10 to 95° C., more preferably from 30 to 95° C., more preferably from 55 to 85° C. It is known that a higher separation temperature decreases the viscosity and improves the separation performance.

The eluant used in the chromatographic separation according to the present invention is either water, a solvent, e.g. an alcohol, or a mixture thereof. Preferably the eluant is water.

The carbohydrate solution to be fractioned is optionally filtrated before chromatographic separation, whereby the filtration may be carried out by using a pressure filter and diatomaceous earth as a filter aid. The pH of the feed solution is optionally adjusted to 1 to 10, preferably 2 to 10, more preferably 2 to 4 and 5 to 10. For instance when pH is high, i.e. 6 to 7, rhamnose is separated first before other more hydrophilic monosaccharides. After the pH has been adjusted the solution may be filtered. The dry substance of the feed solution is adjusted to an appropriate level before chromatographic separation.

A feeding device is used for feeding the solution to the column. The temperature of the column, feed solution and eluant is most preferably approximately 65° C. This is accomplished by preheating the feed solution. The feed solution is eluted in the column by feeding water, for instance demineralized water or e.g. condensate or some other aqueous solution, alcohol or a mixture thereof into the column. The eluant may be pumped through a heat exchanger as well. The flow rate in the column is adjusted to an appropriate level. The fractions of the outcoming solutions are collected at suitable intervals and analyzed. The outcome from the column may be monitored by on-line instruments. The fractionated products, e.g. rhamnose and arabinose, may be isolated by crystallization afterwards or in the following step. Also recycle fractions collected from the other end of the column may be used in a way known per se.

It is clear for the person skilled in the art that the multistep process can be altered by reorganizing the order of the process units or by adding or removing some process units. The person skilled in the art may also add or alter the order of other separation, recovering and concentration units.

Further, it is possible to arrange two or more chromatographic columns in sequence wherein at least one column contains a weakly acid cation excgange resin, the other columns possibly containing a strongly acid cation exchange resin. Also simulated moving bed (SMB) systems may be used. The simulated moving bed system can be either sequential or continuous. In a preferred embodiment of the invention a first column containing a strongly acid cation exchange resin is connected to a second column containing a weakly acid cation exchange resin. Fractions obtained from the second column may be lead to one or more further columns containing either strongly acid or weakly acid cation exchange resins. Such an arrangment further improves the separation performance and increases the yields and purity of the products such as rhamnose, arabinose and xylose. Between the columns there are optionally additional process steps comprising, e.g. precipitation, filtration, crystallization, evaporation or some other concentration process steps or other known process units.

In the multistep process according to the present invention where a weakly acid cation exchange resin is used the elution order of rhamnose and other saccharides is advantageously different from the elution order obtained by using strongly basic resins in bisulfite form or sulfate form or using strongly acid cation exchange resins. One of the advantages relating to the present invention is that different elution order of the components in the chromatographic column is advantageously used in the method of the invention comprising a multistep process. One of the product fractions received is a rhamnose rich fraction, one is a xylose rich fraction, and one is a arabinose rich fraction. According to the multistep process of the present invention using a weakly acid cation exchange resin in a first step rhamnose is preferably eluted before the other monosaccharides, when the resin is in hydrophilic form. This allows rhamnose, and also the other carbohydrates, to be received in good yields with high purity. When the resin is in a more hydrophobic form, rhamnose is eluted in the back slope of the monosaccharide separation.

Figure 8:
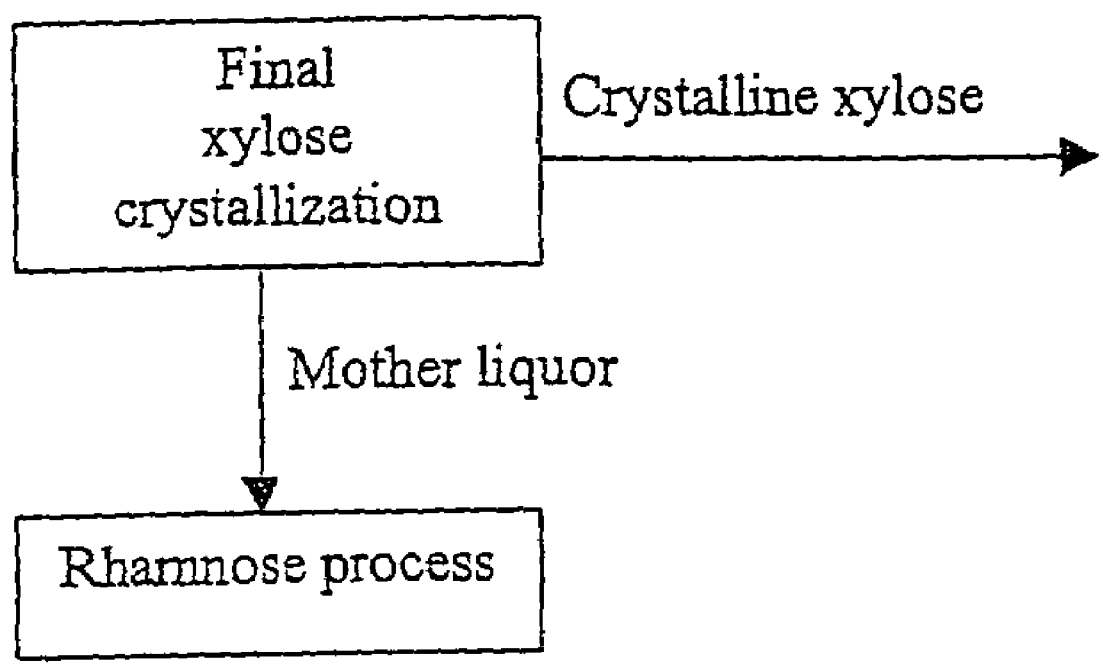
FIGS. 8 and 9 are schematic presentations of embodiments of the present invention.

FIG. 8 presents a schematic drawing where crystalline xylose is produced. The crystallization mother liquor is used in a multistep process for producing rhamnose, comprising at least one step using a weakly acid cation exchange resin.

Figure 9:
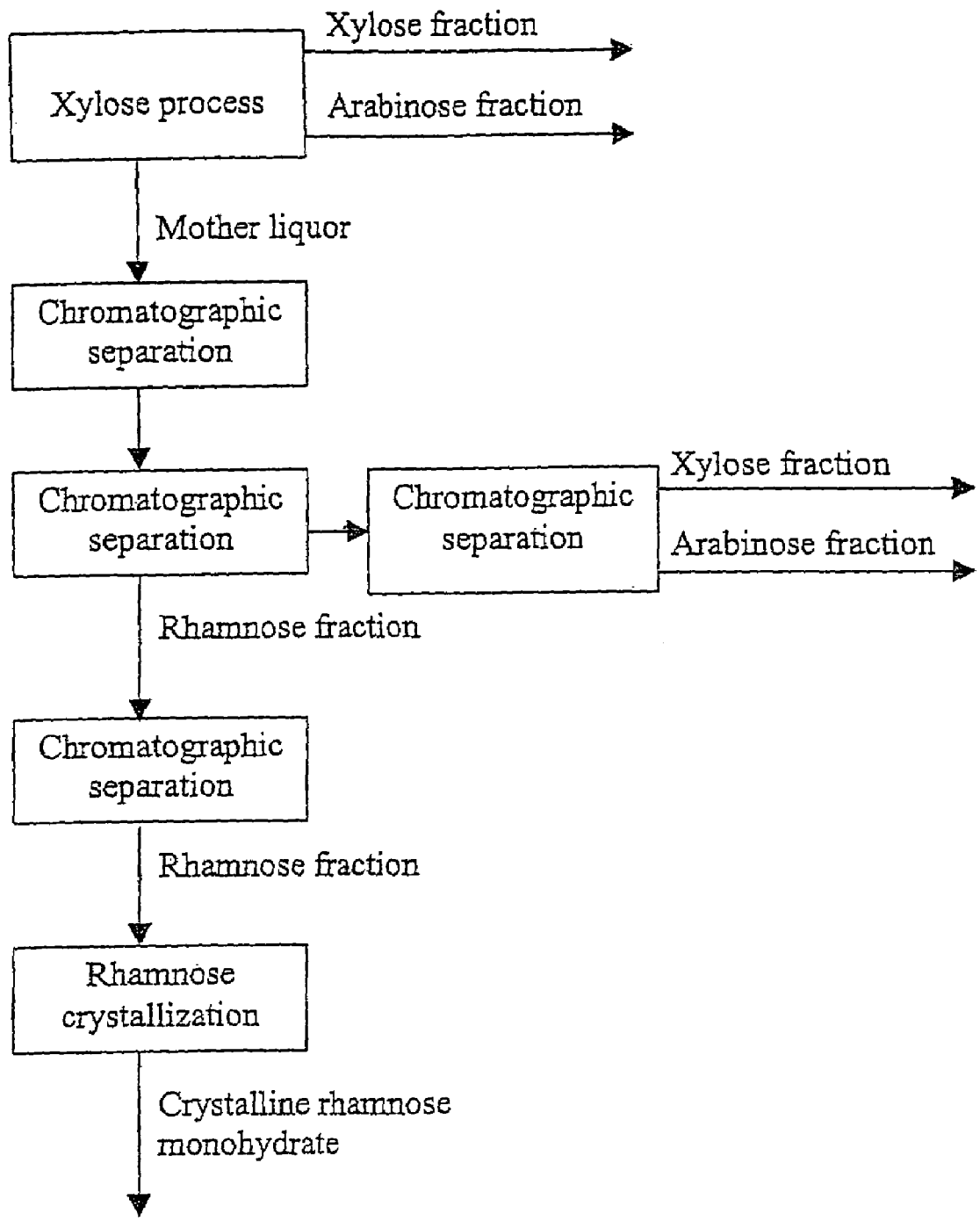

FIG. 9 shows a more detailed example of a multistep process for producing rhamnose. At first xylose is purified in the xylose process and a xylose fraction is recovered. Also an arabinose fraction may be collected. The crystallization mother liquor of the xylose process is further purified by chromatographic separation. The resin may be a weakly acid or strongly acid cation exchange resin. The separation is continued by chromatographic separation and a rhamnose rich fraction is recovered. Again, a weakly acid or strongly acid cation exchange resin can be used. The rest of the outflow can be further separated using a strongly acid cation exchange resin and more xylose can be recovered. Also arabinose may be collected at this step.

Also the rhamnose rich fraction is further purified by using either a weakly or strongly acid cation exchange resin. However, at least one of the thre chromatographic separation steps for the rhamnose fraction is carried out by using a weakly acid cation exchange resin.

Rhamnose crystallization may be carried out after the last separation step. The product obtained is suitably rhamnose monohydrate.

The method according the present invention makes it possible to separate and recover rhamnose and also other products, such as rhamnose, arabinose and xylose, in good yields from solutions containing rhamnose, which has been very difficult by known methods using e.g. strongly acid cation exchange resins. One of the advantages achieved by the method of the present invention over the prior art is that the use of a weakly acid cation exchange resin allows the use of water as an eluant for efficient separation. Known methods using strongly acid cation exchange resins for efficient separation of carbohydrate products of the type mentioned above always require that the eluant is a solvent, e.g. aqueous alcohol. However, when water is used as the eluant, the handling is easier, the costs are lower and the safety is higher. By using water as the sole eluant, problems relating to storage and regeneration, for example, are avoided.

The following examples illustrate the present invention. The examples are not to be construed to limit the claims in any manner whatsoever.

EXAMPLE 1

Chromatographic Separation of Xylose Crystallization Run-off with a $H^+/Mg^{2+}$-form Resin Xylose crystallization run-off which was beech wood based Mg-base si-cooking liquor was subjected to a chromatographic separation. The separation was performed in a laboratory chromatographic separation column as a batch process. The column with a diameter of 0.045 m was filled with an acrylic weakly acid cation exchange resin (Finex CA 12 GC™) manufactured by Finex Oy, Finland. The resin was an ethyl acrylate-based resin. The height of the resin bed was about 0.70 m. The cross-linkage degree of the resin was 6% by weight DVB and the average particle size of the resin was 0.26 mm. The resin was regenerated into mainly $H^+$-form (94% by equivalent) and partly $Mg^{2+}$-form (6% by equivalent) and a feeding device was placed at the top of the resin bed. The temperature of the column and feed solution and eluant water was approximately 65° C. The flow rate in the column was adjusted to 4 ml/min.

The chromatographic separation was carried out as follows:

Step 1:

The dry substance of the feed solution was adjusted to 25 g dry substance in 100 g solution according to the refractive index (RI) of the solution. The pH of the feed solution was 3.5.

Step 2:

100 ml of preheated feed solution was pumped to the top of the resin bed.

Step 3:

The feed solution was eluted downwards in the column by feeding preheated ion-exchanged water to the top of the column.

Step 4:

10 ml samples of the outcoming solution were collected at 3 min intervals. The composition of the samples was analysed with Dionex HPLC equipment with pulsed electrochemical detector and CarboPac PA1™ anion exchange column (water and 0.2 M NaOH as eluants).

The resin gives a good separation of rhamnose and arabinose from other monosaccharides. Rhamnose and arabinose are eluted at the end of the profile. The pH of the effluent was between 3 and 4. The results are shown graphically in FIG. 1.

EXAMPLE 2

Purification of L-Rhamnose by Chromatograhic Separation

Xylose precipitation crystallization (the final run-off) mother liquor from birch wood based si-cooking was used as a starting material and was thus subjected to a chromatographic separation in a batch separation column.

The separation was performed in a pilot chromatographic separation column as a batch process. The whole equipment consisted of a feed tank, a feed pump, a heat exchanger, a chromatographic separation column, product containers, pipelines for input of feed solution as well as eluant water, pipelines for output and flow controlling equipments.

The column with a diameter of 0.225 m was filled with an acrylic weakly acid cation exchange resin (manufactured by Finex Ltd., Finland); the height of the resin bed was about 5.2 m. The degree of cross-linkage was 3% by weight DVB and the average particle size was 0.34 mm. The resin was regenerated into sodium ($Na^+$) form and a feeding device was then placed at the top of the resin bed. The temperature of the column, feed solution and eluant water was 65° C. The flow rate in the column was adjusted to 40 l/h.

The feed solution was pre-treated first by filtration, which was done using a pressure filter and diatomaceous earth as filter aid. The feed solution was then heated to 65° C. and the pH was adjusted to pH 6.0 with sodium hydroxide solution, after which the solution was filtered.

Chromatographic separation was carried out as follows:

Step 1:

The dry substance of the feed solution was adjusted to 35 g dry substance in 100 g of solution according to the refractive index (RI) of the solution.

Step 2:

20 l of preheated feed solution was transferred to the top of the resin bed.

Step 3:

The feed solution was eluted downwards in the column by feeding ion exchanged preheated water to the top of the column.

Step 4:

The density and conductivity of the outcoming solution were measured continuously and according to this information, the outcoming solution was collected and divided into two fractions (when the feed profiles were overlapping) in the following order: rhamnose fraction (containing most of the rhamnose) and xylose fraction (containing most of the xylose, other saccharides and salts). The sequential feeds can also be done without overlapping and thus the outcoming solution can be divided into four fractions in the following order: residual fraction number one (containing salts), rhamnose fraction (containing most of the rhamnose), xylose fraction (containing most of the xylose and some other monosaccharides) and residual fraction number two (containing other monosaccharides). Optionally between the outcoming fractions can be taken recycle fractions which can be recycled for diluting the feed or which can be fed as such into the column.

The amount of dry substance as well as rhamnose and xylose content in the feed solution and in product fractions are presented in Table 1. The concentrations of the successive components are expressed as percentages of the total dry substance in the particular fraction. The yield of rhamnose and xylose in product fractions are also presented (the amount of the component in the particular fraction in relation to the total amount of that component in all outcoming fractions).

TABLE 1

Compositions and yields (when profiles were overlapping and the outcoming solution was divided in two fractions)

| | Feed solution | Rhamnose fraction | Xylose fraction |
|---|---|---|---|
| DS in fraction, kg | 8.0 | 2.2 | 5.8 |
| DS g/100 g solution | 30.0 | 8.9 | 15.5 |
| Rhamnose, % of DS in fraction | 5.5 | 18.0 | 0.8 |

TABLE 1-continued

Compositions and yields (when profiles were overlapping and the outcoming solution was divided in two fractions)

|  | Feed solution | Rhamnose fraction | Xylose fraction |
|---|---|---|---|
| Xylose, % of DS in fraction | 22.5 | 13.2 | 25.6 |
| Rhamnose, yield % |  | 90.0 | 10.0 |
| Xylose, yield % |  | 17.0 | 83.0 |

Figure 2:
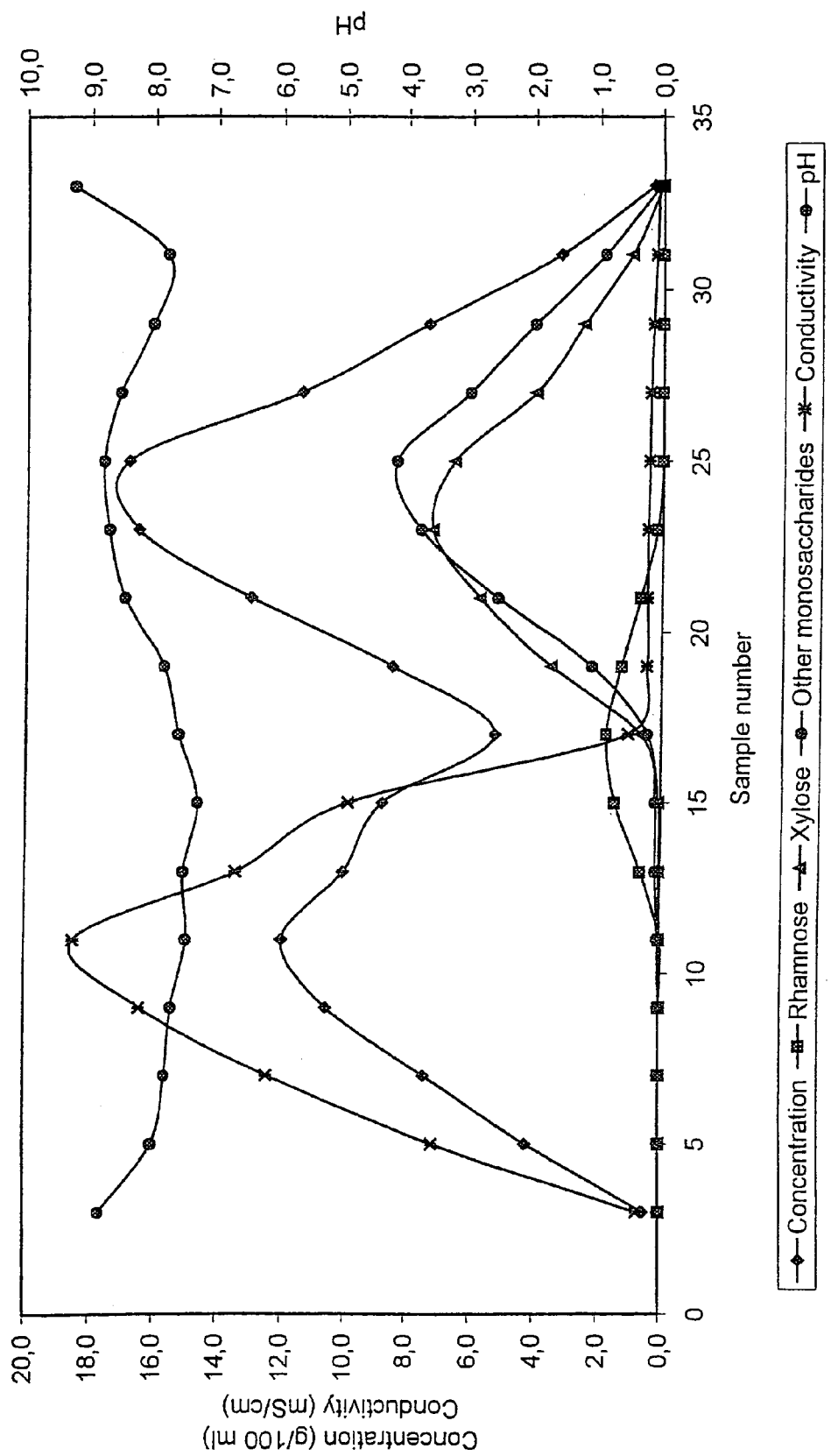
FIG. 2 is a graphical presentation of the elution profiles and pH according to Example 2.

The pH of the effluent was between 7.3 and 9.3. The results are shown graphically in FIG. 2.

EXAMPLE 3

Chromatographic Separation of Xylose-Arabinose Fraction from Rhamnose Separation Arabinose containing xylose fraction, prepared as in Example 2, from rhamnose separation was subjected to a chromatographic separation. The separation was performed in a pilot chromatographic separation column as a batch process. The column with a diameter of 0.225 m was filled with a strong acid cation exchange resin (Finex CS 13 GC™, manufactured by Finex Oy, Finland). The height of the resin bed was 5.0 m. The cross-linkage degree of the resin was 5.5% by weight DVB and the average particle size about 0.4 mm. The resin was in $Ca^{2+}$-form. A feeding device was placed at the top of the resin bed. The temperature of the column, feed solution and eluant water was approximately 65° C. The flow rate in the column was adjusted to 30 l/h. A check filtration (through a filter bag) was made prior the separation.

The chromatographic separation was carried out as follows:

Step 1:

The dry substance of the feed solution was adjusted to 30 g dry substance in 100 g solution according to the refractive index (RI) of the solution:

Step 2:

15 liters of preheated feed solution was pumped to the top of the resin bed.

Step 3:

The feed solution was eluted downwards in the column by feeding preheated ion-exchanged water to the top of the column.

Step 4:

The density and conductivity of the outcoming solution were measured continuously. The outcoming solution was collected and divided into three fractions in the following order: residual fraction (containing some of the xylose), xylose rich fraction (containing most of the xylose and other monosaccharides) and arabinose rich fraction (containing most of the arabinose). The amount of dry substance as well as arabinose and xylose content in the feed solution and in product fractions are presented in table 2. The concentrations of the components are expressed as percentages of the total dry substance in the particular fraction. The yield of arabinose and xylose in product fractions is also presented (the amount of the component in the particular fraction in relation to the total amount of that component in all outcoming fractions).

TABLE 2

Compositions and yields

|  | Feed solution | Xylose fraction | Arabinose fraction |
|---|---|---|---|
| DS in fraction, kg | 5.0 | 3.3 | 1.7 |
| DS g/100 g solution | 30 |  |  |
| Arabinose, % | 3.7 | 0.5 | 10.0 |
| Xylose, % | 36.5 | 44.0 | 21.0 |
| Arabinose, yield % |  | 10.0 | 90.0 |
| Xylose, yield % |  | 80.0 | 20.0 |

Figure 3:
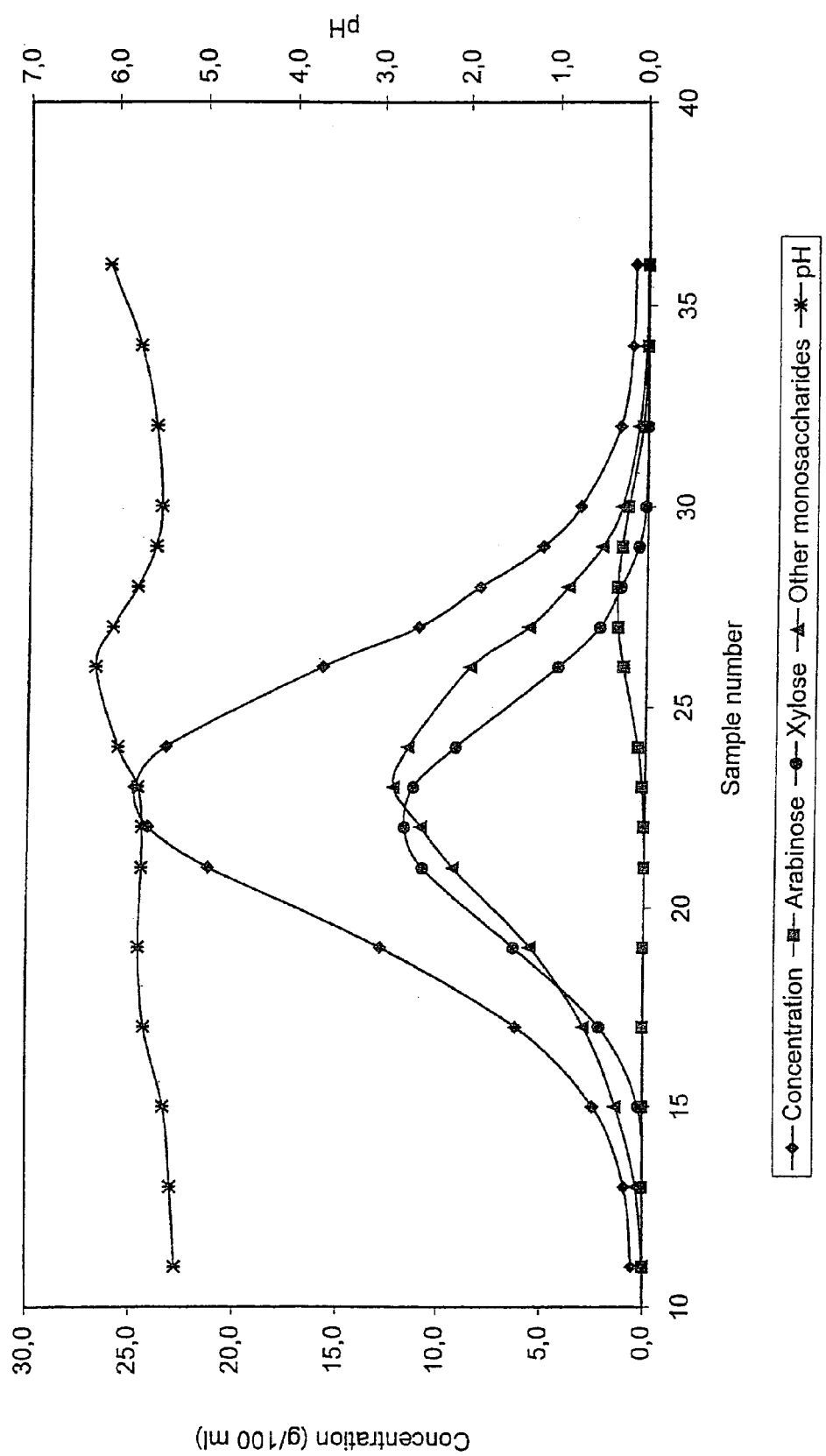
FIG. 3 is a graphical presentation of the elution profiles and pH according to Example 3.

Arabinose was eluting at the back slope of the profile. Galactose and mannose and especially glucose and xylose can be separated from arabinose effectively. The arabinose content (% of the total dry substance) in the arabinose rich product fraction was 3-fold compared to the arabinose content in feed solution and the arabinose recovery was then 90%. The pH of the effluent is between 5.3 and 6. The results are shown graphically in FIG. 3.

EXAMPLE 4

Chromatographic Separation of Xylose Crystallization Run-off with a $Na^+$-form Strong Acid Cation Exchange Resin Xylose precipitation crystallization run-off which was birch wood based Ca-base si-cooking liquor was subjected to a chromatographic separation in a batch separation column. The separation was performed in a pilot scale chromatographic separation column as a batch process.

The whole equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 0.225 m was filled with a strongly acid cation exchange resin (manufactured by Finex ltd, Finland). The height of the resin bed was approximately 5.1 m. The degree of cross-linkage was 5.5% by weight DVB and the average particle size of the resin was 0.41 mm. The resin was regenerated into sodium ($Na^+$) form and a feeding device was placed at the top of the resin bed. The temperature of the column, feed solution and eluant water was approximately 65° C. The flow rate in the column was adjusted to 30 l/h.

The feed solution was pre-treated by filtration by using a pressure filter and diatomaceous earth as filter aid. The feed solution was then heated to 65° C. and the pH was adjusted to pH 6, after which the solution was filtered via filter.

Chromatographic separation was carried out as follows:

Step 1.

The dry substance of the feed solution was adjusted to 35 g dry substance in 100 g of solution according to the refractive index (RI) of the solution.

Step 2.

15 l of the preheated feed solution was pumped to the top of the resin bed.

Step 3.

The feed solution was eluted downwards in the column by feeding preheated ion-exchanged water to the top of the column.

Step 4.

The density and conductivity of the outcoming solution were measured continuously. The outcoming solution was collected and divided into two fractions in the following order:

residual fraction (containing most of the salts) and xylose fraction (containing xylose, rhamnose, arabinose and other monosaccharides).

The amount of dry substance as well as rhamnose, arabinose and xylose content in the feed solution and in product fraction (xylose fraction) are presented in table 3. The concentrations of the components are expressed as percentages of the total dry substance in the particular fraction. The yield of rhamnose, arabinose and xylose in product fraction are also presented (the amount of the component in the particular fraction in relation to the total amount of that component in all outcoming fractions). The colour (ICUMSA, measured at pH 5) of the feed solution and product fraction are also presented as well as colour removal %.

TABLE 3

Compositions, yields and colors

|  | Feed solution fraction (nominal) | Xylose fraction (analyzed from samples) | Residual (analyzed from samples) |
|---|---|---|---|
| DS in fraction, kg | 5.9 | 4.3 | 2.1 |
| DS g/100 g solution | 34.5 | 9.3 | 3.5 |
| Rhamnose, % | 5.6 | 7.1 | 0.04 |
| Arabinose, % | 2.8 | 3.9 | 0.03 |
| Xylose, % | 26.0 | 37.7 | 0.1 |
| Color, ICUMSA | 38 900 | 5 000 |  |
| Rhamnose, yield % |  | 99.7 |  |
| Arabinose, yield % |  | 99.6 |  |
| Xylose, yield % |  | 99.9 |  |
| Colour removal, % |  | 87.1 |  |

Figure 4:
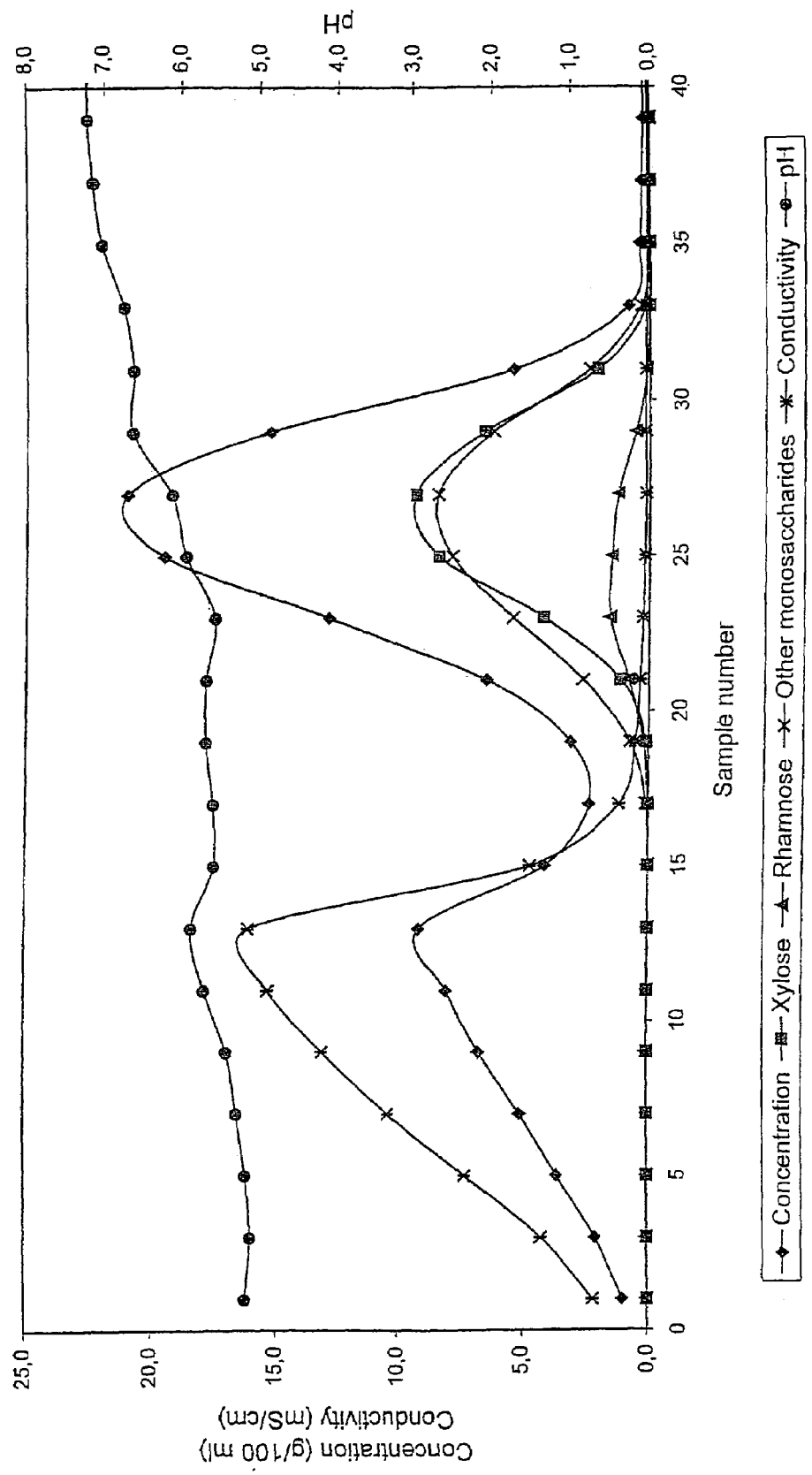
FIG. 4 is a graphical presentation of the elution profiles and pH according to Example 4.

Most of the salts and color were removed from xylose precipitation crystallization run-off with a $Na^+$-form strong acid cation exchange resin. Also the amounts of rhamnose, arabinose and xylose were higher in the product fraction than in the feed solution. The pH of the effluent was between 5.5 and 7.2. The results are shown graphically in FIG. 4.

EXAMPLE 5

Chromatographic Separation of Rhamnose Containing Xylose Fraction

Xylose fraction prepared according to example 4 (containing xylose, rhamnose, arabinose and other monosaccharides) was subjected to a chromatographic separation in a batch separation column. The separation was performed in a pilot scale chromatographic separation column as a batch process.

The whole equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 1.0 m was filled with a weakly acid cation exchange resin (Finex CA 16 GC™) manufactured by Finex Ltd, Finland. The resin was methyl acrylate-based resin. The height of the resin bed was approximately 5.0 m. The degree of cross-linkage was 8% by weight DVB and the average particle size of the resin was 0.28 mm. The resin was regenerated into sodium ($Na^+$) form and a feeding device was placed at the top of the resin bed. The temperature of the column, feed solution and eluant water was 65° C. The flow rate in the column was adjusted to 785 l/h.

The pH of the feed solution was adjusted to pH 6.5 after which the solution was filtered via filter.

Chromatographic separation was carried out as follows:

Step 1.

The dry substance of the feed solution was adjusted to 35 g dry substance in 100 g of solution according to the refractive index (RI) of the solution.

Step 2.

400 l of the preheated feed solution was pumped to the top of the resin bed.

Step 3.

The feed solution was eluted downwards in the column by feeding preheated ion-exchanged water to the top of the column.

Step 4.

The density and conductivity of the outcoming solution were measured continuously. The outcoming solution was collected and divided into three fractions (when the feed profiles were not overlapping) in the following order: residual fraction (containing most of the salts), rhamnose rich fraction (containing most of the rhamnose) and xylose rich fraction (containing most of the xylose, arabinose and other monosaccharides).

The amount of dry substance as well as rhamnose and xylose content in the feed solution and in product fractions are presented in table 4. The concentrations of the components are expressed as percentages of the total dry substance in the particular fraction. The yield of rhamnose and xylose in product fractions is also presented (the amount of the component in the particular fraction in relation to the total amount of that component in all outcoming fractions).

TABLE 4

Compositions and yields

|  | Feed solution | Rhamnose fraction | Xylose fraction |
|---|---|---|---|
| DS in fraction, kg | 160 | 44 | 114 |
| DS g/100 g solution | 36.1 | 6.2 | 10.6 |
| Rhamnose, % | 6.7 | 21.9 | 0.9 |
| Xylose, % | 37.4 | 24.5 | 36.5 |
| Rhamnose, yield % |  | 90.4 | — |
| Xylose, yield % |  | — | 79.0 |

Figure 5:
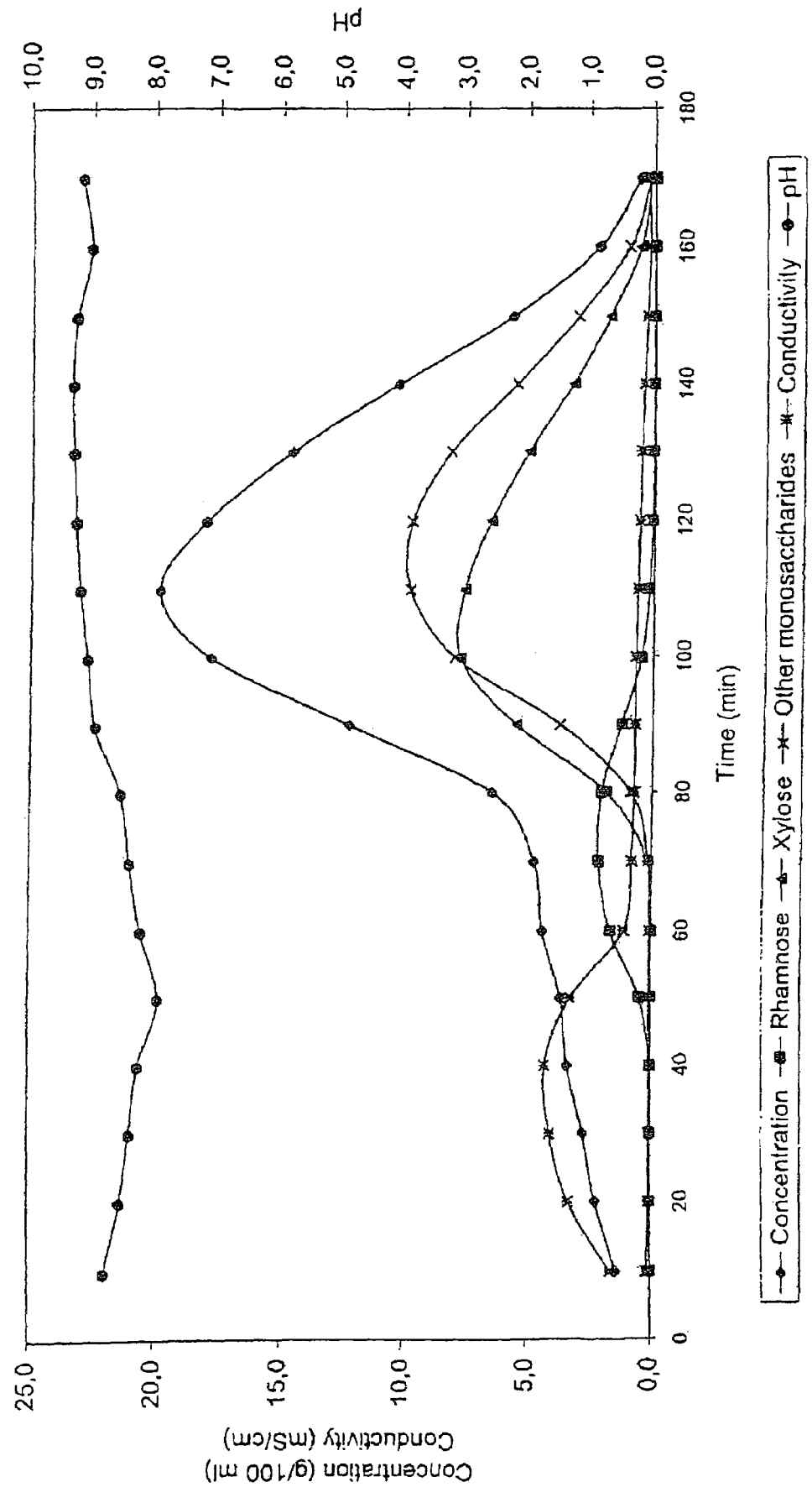
FIG. 5 is a graphical presentation of the elution profiles and pH according to Example 5.

Rhamnose content (% of the total dry substance) in rhamnose rich product fraction was 3,3-fold compared to rhamnose content in feed solution. Rhamnose was separated from feed solution with a good yield. The pH of the effluent was between 8 and 9. The reusults are shown graphically in FIG. 5. Arabinose can be separated from the xylose fraction for example by using a strongly acid cation exchange resin.

EXAMPLE 6

Chromatographic Separation of Rhamnose Rich Fraction with a Weakly Acid Cation Exhange Resin Rhamnose rich fraction prepared according to example 5 was subjected to a chromatographic separation in a batch separation column. The separation was performed in a pilot scale chromatographic separation column as a batch process.

The whole equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 1.0 m was filled with a weakly acid cation exchange resin (Finex CA 16 GC™) manufactured by Finex Ltd, Finland. The resin was methyl acrylate-based resin. The height of the resin bed was approximately 5.0 m. The degree of cross-linkage was 8 w-% DVB and the average particle size of the resin was 0.28 mm. The resin was regenerated into sodium ($Na^+$) form and a feeding device was placed at the top of the resin bed. The temperature of the column, feed solution and eluant water was 65° C. The flow rate in the column was adjusted to 785 l/h.

The pH of the feed solution was adjusted to pH 6.5 after which the solution was filtered via filter.

Chromatographic separation was carried out as follows:

Step 1.

The dry substance of the feed solution was adjusted to 35 g dry substance in 100 g of solution according to the refractive index (RI) of the solution.

Step 2.

250 l of the preheated feed solution was pumped to the top of the resin bed.

Step 3.

The feed solution was eluted downwards in the column by feeding preheated ion-exchanged water to the top of the column.

Step 4.

The density and conductivity of the outcoming solution were measured continuously. The outcoming solution was collected and divided into three fractions (when the feed profiles were not overlapping) in the following order: first residual fraction (containing most of the salts), rhamnose rich frac-tion (containing most of the rhamnose) and second residual fraction (containing most of the xylose and other monosaccharides).

The amount of dry substance as well as rhamnose and xylose content in the feed solution and in product fraction are presented in table 5. The concentrations of the components are expressed as percentages of the total dry substance in the particular fraction. The yield of rhamnose in product fraction is also presented (the amount of the component in the particular fraction in relation to the total amount of that component in all outcoming fractions).

TABLE 5

Compositions and yields

|  | Feed solution | Rhamnose fraction |
|---|---|---|
| DS in fraction, kg | 100 | 39 |
| DS g/100 g solution | 35.5 | 8.6 |
| Rhamnose, % | 21.6 | 47.0 |
| Xylose, % | 23.1 | 6.2 |
| Rhamnose, yield % |  | 86.0 |

Figure 6:
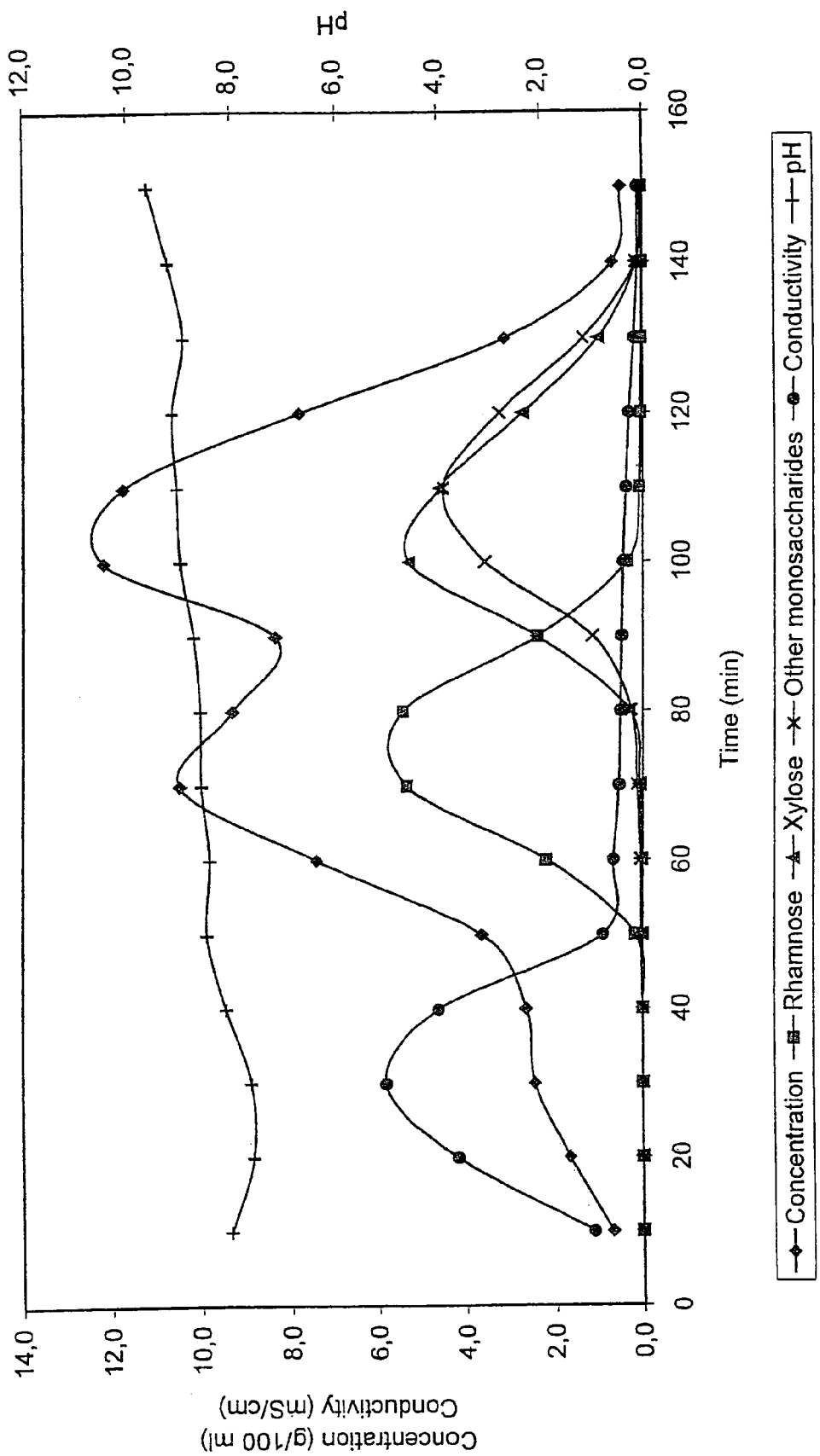
FIG. 6 is a graphical presentation of the elution profiles and pH according to Example 6.

The rhamnose content (% of the total dry substance) in product fraction was 2,2-fold compared to rhamnose content in feed solution. Rhamnose was separated from feed solution with a good yield. The pH of the effluent was between 8 and 10. The results are shown graphically in FIG. 6.

EXAMPLE 7

Chromatographic Separation of Rhamnose Rich Fraction with a $Ca^{2+}$-form Strong Acid Cation Exchange Resin Rhamnose rich fraction prepared according to example 6 was subjected to a chromatographic separation in a batch separation column. The separation was performed in a pilot scale chromatographic separation column as a batch process.

The whole equipment consisted of a feed tank, a feed pump, a heat exchanger, a chromatographic separation column, product containers, pipelines for input of feed solution as well as eluant water, pipelines for output and flow control for the outcoming liquid.

The column with a diameter of 0.6 m was filled with a strong acid cation exchange resin (Finex CS 11 GC) manufactured by Finex Ltd, Finland. The height of the resin bed was approximately 5.0 m. The degree of cross-linkage was 5.5 w-% DVB and the average particle size of the resin was 0.40 mm. The resin was regenerated into sodium ($Ca^{2+}$) form and a feeding device was placed at the top of the resin bed. The temperature of the column, feed solution and eluant water was 65° C. The flow rate in the column was adjusted to 210 l/h.

The pH of the feed solution was adjusted to pH 6.5 after which the solution was filtered via filter.

Chromatographic separation was carried out as follows:

Step 1.

The dry substance of the feed solution was adjusted to 30 g dry substance in 100 g of solution according to the refractive index (RI) of the solution.

Step 2.

110 l of the preheated feed solution was pumped to the top of the resin bed.

Step 3.

The feed solution was eluted downwards in the column by feeding preheated ion-exchanged water to the top of the column.

Step 4.

The density and conductivity of the outcoming solution were measured continuously. The outcoming solution was collected and divided into three fractions (when the feed profiles were not overlapping) in the following order: first residual fraction (containing components other than monosaccharides), rhamnose rich fraction (containing most of the rhamnose) and second residual fraction (containing other monosaccharides and other components).

The amount of dry substance as well as rhamnose content in the feed solution and in product fraction are presented in table 6. The concentration of rhamnose is expressed as percentage of the total dry substance in the particular fraction. The yield of rhamnose in product fraction is also presented (the amount of the component in the particular fraction in relation to the total amount of that component in all outcoming fractions).

TABLE 6

Compositions and yields

|  | Feed solution (nominal) | Rhamnose fraction (analyzed from samples) |
|---|---|---|
| DS in fraction, kg | 37 | 34.8 |
| DS g/100 g solution | 30 | 10.2 |
| Rhamnose, % | 47.9 | 55.4 |
| Rhamnose, yield % |  | 99.0 |

Figure 7:
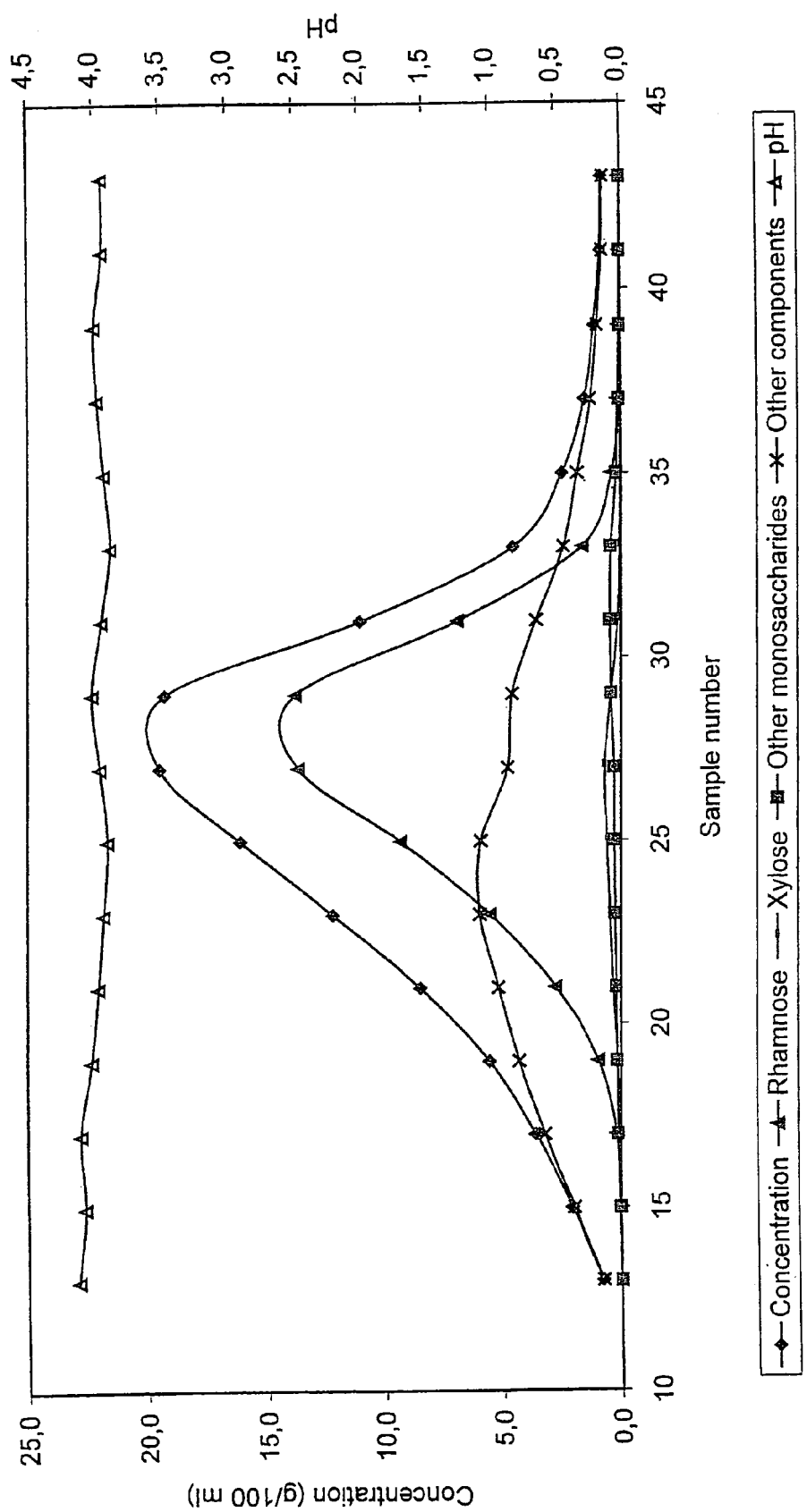
FIG. 7 is a graphical presentation of the elution profiles and pH according to Example 7.

Rhamnose purity was increased by 16%. Rhamnose yield was excellent being 99%. The pH of the effluent was between 3.5 and 4. The results are shown graphically in FIG. 7.

EXAMPLE 8

Crystallization of Rhamnose 13100 g of a rhamnose syrup having DS of 14% and a rhamnose content of 52.3%, based on the refractometric dry solids content of pure rhamnose, was evaporated to RDS of 86.9% and moved to a 2-liter reaction vessel at a temperature of 65° C. Seeding (at 65° C., a RDS of 86.9%) was made to the boiling syrup with 0.03% seeds on DS.

The mass was cooled down from a temperature of 65° C. to a temperature of 40° C. in 16 hours. After 16 hours from seeding, the centrifuging without wash gave a cake purity 98.5% on RDS and a mother liquor purity 21.2% on RDS, which corresponds to a 76% rhamnose yield. The crystal size was 200 . . . 350 μm. The moisture content of the dried crystals was 10.0% measured with a Karl Fischer titration method. The results are shown in table 7.

| Sample | RDS % by weight | Monosaccharides (PED LC) % on weight RDS | | | | | | |
|---|---|---|---|---|---|---|---|---|
| | | Rhamnose | Arabinose | Galactose | Glucose | Xylose | Mannose | Fructose |
| Feed | 14.1 | 52.3 | 0.6 | 4.6 | 2.3 | 12.8 | 4.6 | 0.6 |
| Mother liquor, no wash | 54.3 * | 21.2 | 0.7 | 7.8 | 4.0 | 21.3 | 7.8 | 1.0 |
| Cake, no wash | 90.0 | 98.5 | — | 0.1 | 0.0 | 0.3 | 0.1 | — |

* diluted sample

EXAMPLE 9

Arabinose Crystallization

The arabinose containing feed liquid was added to a 400-liter boiling crystallizer. The evaporation was started at a temperature of 60° C. and at a pressure of 10 mbar. The boiling liquid was seeded with 0.03% seeds on DS at DS of 67.9% at a temperature of 60° C. and at a pressure of 130 mbar. After seeding the boiling crystallization was continued for 3 hours at a temperature of 60° C. and a new feed liquid was added continuously into the boiling crystallizer. A 400-liter batch of the mass obtained by boiling crystallization (DS of mass 68.9%) was moved to a 400-liter cooling crystallizer.

The mass was cooled down from a temperature of 60° C. to a temperature of 30° C. in 20 hours. After cooling crystallization the mass was centrifuged. The crystals were dried and packed.

What is claimed is:

1. A method for recovering one or more monosaccharides from a feed solution containing rhamnose and at least one monosaccharide selected from the group consisting of arabinose, xylose and mixtures thereof by using chromatographic separation, comprising a multistep process wherein at least one step comprises using a weak acid cation exchange resin for said chromatographic separation so as to obtain a rhamnose rich fraction and thus recover rhamnose from the feed solution.

2. The method of claim 1, comprising feeding the feed solution to a chromatographic column containing a weak acid cation exchange resin, eluting said chromatographic column with an eluant, and separating and recovering the rhamnose rich fraction.

3. The method of claim 1, wherein a strong acid cation exchange resin is further used for the chromatographic separation.

4. The method of claim 1, wherein the multistep process further comprises steps selected from the group consisting of crystallization, filtration, evaporation, precipitation and ion exchange.

5. The method of claim 1, wherein the rhamnose recovered is L-rhamnose.

6. The method of claim 1, wherein the feed solution is a xylose process stream or side stream.

7. The method of claim 1, wherein an arabinose rich fraction is further separated and recovered from the feed solution.

8. The method of claim 7, wherein the arabinose to be recovered is L-arabinose.

9. The method of claim 1, wherein a xylose rich fraction is further separated and recovered from the feed solution.

10. The method of claim 9, wherein the xylose to be recovered is D-xylose.

11. The method of claim 1, wherein the weak acid cation exchange resin is an acrylic resin.

12. The method of claim 11, wherein the acrylic resin is derived from the group consisting of methyl acrylate, ethyl acrylate, butyl acrylate, methyl methacrylate, acrylonitrile, acrylic acids and mixtures thereof.

13. The method of claim 11, wherein the cation of said weak acid cation exchange resin is in the form selected from the group consisting of $Na^+$, $Mg^{2+}$, $H^+$ and $Ca^{2+}$.

14. The method of claim 13, wherein the cation of said weak acid cation exchange resin is in $Na^+$ form.

15. The method of claim 11, wherein the resin is crosslinked with divinyl benzene (DVB).

16. The method of claim 15, wherein the crosslinking degree of the resin is 3 to 8% by weight.

17. The method of claim 2, wherein the eluant is water.

18. The method of claim 1, comprising feeding the feed solution to a first chromatographic column and then feeding a fraction of the outcoming solution from the first chromatographic column to a second chromatographic column, both columns containing a weak acid cation exchange resin.

19. The method of claim 18, comprising feeding a fraction of the outcoming solution from the second chromatographic column to a third chromatographic column containing a strong acid cation exchange resin and feeding a fraction of the outcoming solution from the third chromatographic column to a fourth chromatographic column containing strong acid cation exchange resin.

20. The method of claim 1, comprising feeding the feed solution to a first chromatographic column containing a strong acid cation exchange resin and then feeding a fraction of the outcoming solution from the first chromatographic column to a second chromatographic column containing a weak acid cation exchange resin.

21. The method of claim 20, comprising feeding a fraction of the outcoming solution from the second chromatographic column to a third chromatographic column containing a weak acid cation exchange resin.

22. The method of claim 18, comprising feeding a fraction of the outcoming solution from the second chromatographic column to a third chromatographic column containing a strong acid cation exchange resin.

23. The method of claim 20, comprising feeding a fraction of the outcoming solution from the second chromatographic column to a third chromatographic column containing a strong acid cation exchange resin.

24. The method of claim 18, wherein prior to feeding the fraction of the outcoming solution to the next chromatographic column said fraction is concentrated by evaporation.

25. The method of claim 20, wherein prior to feeding the fraction of the outcoming solution to the next chromatographic column said fraction is concentrated by evaporation.

26. The method of claim 2, wherein the temperature of the eluant is from 10° C. to 95° C.

27. The method of claim 26, wherein the temperature of the eluant is from 55° C. to 85° C.

28. The method of claim 1, wherein the particle size of the weak acid cation exchange resin is 10 to 2000 $\mu$m.

29. The method of claim 28, wherein the particle size of the weak acid cation exchange resin is 100 to 400 $\mu$m.

30. The method of claim 1, wherein the pH of a feed solution is 1 to 10.

31. The method of claim 30, wherein the pH of the feed solution is 2 to 4.

32. The method of claim 30, wherein the pH of the feed solution is 5 to 10.

33. The method of claim 18, comprising recovering xylose and arabinose from both the first and the second chromatographic column.

34. The method of claim 20, comprising recovering xylose and arabinose from both the first and the second chromatographic column.

35. The method of claim 7, comprising isolating arabinose of the arabinose rich fraction by crystallization.

36. The method of claim 19, comprising recovering rhamnose from the second and/or the third chromatographic column.

37. The method of claim 21, comprising recovering rhanmnose from the second and/or the third chromatographic column.

38. The method of claim 5, comprising further isolating L-rhamnose by crystallization.

39. The method of claim 5, comprising isolating L-rhanmnose in the form of monohydrate.

40. The method of claim 9, comprising isolating xylose of the xylose rich fraction by crystallization.

41. The method of claim 1, wherein the method is a batch process.

42. The method of claim 1, wherein the rhamnose fraction is collected before the other monosaccharides.

43. The method of claim 1, wherein the rhamnose fraction is collected after the other monosaccharides.

44. The method of claim 1, wherein the feed solution includes rhamnose and arabinose and both are collected together.

45. The method of claim 1, wherein the chromatographic separation method is a simulated moving bed system.

46. The method of claim 45, wherein the simulated moving bed system is sequential.

47. The method of claim 45, wherein the simulated moving bed system is continuous.

48. The method of claim 45, wherein at least one column or a part of a column contains a strong acid cation exchange resin and at least one column contains a weak acid cation exchange resin.

* * * * *